US012651179B2

(12) United States Patent (10) Patent No.: US 12,651,179 B2
Ding et al. (45) Date of Patent: Jun. 9, 2026

(54) REINFORCEMENT LEARNING MODEL FOR BALANCED UNIT RECOMMENDATION

(71) Applicant: SAP SE, Walldorf (DE)

(72) Inventors: Lei Ding, Chengdu (CN); Yangyang Chen, Chengdu (CN)

(73) Assignee: SAP SE, Walldorf (DE)

( * ) Notice: Subject to any disclaimer, the term of this patent is extended or adjusted under 35 U.S.C. 154(b) by 1169 days.

(21) Appl. No.: 17/556,238

(22) Filed: Dec. 20, 2021

(65) Prior Publication Data

US 2023/0196140 A1 Jun. 22, 2023

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .......... G06N 20/00; G06N 5/04; G06N 3/092
See application file for complete search history.

(56) References Cited

U.S. PATENT DOCUMENTS

| | | | | |
|---|---|---|---|---|
| 10,824,420 | B2 * | 11/2020 | Collins | ..................... G06F 8/10 |
| 2018/0005253 | A1 * | 1/2018 | Megahed | ............. G06Q 10/067 |
| 2018/0165603 | A1 * | 6/2018 | Van Seijen | ............ G06N 3/045 |
| 2018/0165745 | A1 * | 6/2018 | Zhu | ..................... G06Q 30/0631 |
| 2018/0342004 | A1 * | 11/2018 | Yom-Tov | ............... G06N 20/00 |
| 2019/0371348 | A1 * | 12/2019 | Shahbazi Mirzahasanloo | ............ G10L 19/038 |
| 2020/0241542 | A1 * | 7/2020 | Sung | ..................... B60W 40/09 |
| 2020/0326934 | A1 * | 10/2020 | Tepper | ................... G06N 3/044 |

| | | | | |
|---|---|---|---|---|
| 2020/0371509 | A1 * | 11/2020 | Mark | ................. G05B 19/4183 |
| 2021/0027178 | A1 * | 1/2021 | Ding | ................... G06F 16/9535 |
| 2021/0116888 | A1 * | 4/2021 | Roy | ................... G05B 13/0265 |

OTHER PUBLICATIONS

Bhandari, Jalaj, et al. "A Finite Time Analysis of Temporal Difference Learning with Linear Function Approximation." Operations Research, vol. 69, No. 3, 2021, pp. 950-973. (Year: 2021).*
Teng, Teck-Hou, Zhong-Ming Tan, and Ah-Hwee Tan. "Self-organizing neural models integrating rules and reinforcement learning." 2008 IEEE International Joint Conference on Neural Networks (IEEE World Congress on Computational Intelligence). IEEE, 2008. (Year: 2008).*

* cited by examiner

*Primary Examiner* — Vincent Gonzales
*Assistant Examiner* — Pedro J Morales
(74) *Attorney, Agent, or Firm* — Buckley, Maschoff & Talwalkar LLC

(57) ABSTRACT

Embodiments are associated with unit recommendations for an online establishment backend service. A reinforcement learning apparatus integrates a reinforcement learning algorithm model into the online establishment backend service and plugs streaming data representing user behavior and unit performance into the model. The reinforcement learning algorithm model is used to generate unit recommendations, and periodically collected relevant data is used to update the reinforcement learning algorithm model. In some embodiments, the reinforcement learning apparatus retrieves relevant unit data from a unit historical data store and user behavior data from an archive user behavior data store. The retrieved data can then be fed, during an offline training phase, into the reinforcement learning algorithm model before integrating the reinforcement learning algorithm model into the online establishment backend service (e.g., to improve system performance).

17 Claims, 12 Drawing Sheets

S710

Clarify Input And Output Data
Structure

S720

Implement Algorithm And Export
Execute Graph Of Algorithm

S730

Upload Execute Graph Of
Algorithm Model Into
Production System

S740

Enhance Caller Language

S750

Save Optimal Parameters
Based On Daily Training

1100

| RL ALGORITHM MODEL IDENTIFIER 1102 | DATE (TIME) 1104 | TENANT IDENTIFIER 1106 | ONLINE ESTABLISHMENT IDENTIFIER 1108 | UNIT RECOMMENDATIONS 1110 |
|---|---|---|---|---|
| RLAM_101 | 12/1/2025 (08:35) | TENANT A | | |
| US_102 | 12/2/2025 (13:51) | TENANT B | | |
| RLAM_103 | 12/2/2025 (11:01) | TENANT C | | |
| RLAM_101 | 12/3/2025 (03:45) | TENANT A | | |

*FIG. 11*

REINFORCEMENT LEARNING MODEL FOR BALANCED UNIT RECOMMENDATION

TECHNICAL FIELD

Some embodiments generally relate to methods and systems for use with computer devices, including networked computing devices. More particularly, some embodiments relate to the use of a reinforcement learning model to facilitate a more balanced unit recommendation.

BACKGROUND

An establishment may offer units to users. For example, an online merchant might offer products, or bundles of products (e.g., a basketball, t-shirt, and sneakers) to potential customers. It is to be expected that one particular unit might be more popular with users as compared to another unit. Similarly, some units might be more profitable for the establishment as compared to other units. As a result, an establishment (e.g., an e-commerce platform and/or platform designers) can encounter a difficult requirement: how to reach an equilibrium between gaining product profit and satisfying customer's interest. In addition, those factors have been interconnected under complex scenarios, which can make design of an efficient recommendation algorithm a difficult task. Another challenge may be the factors that determine how to suggest products to end customers can vary as time passes. Even if these issues can be addressed to some degree, there is currently no solution to smoothly integrate algorithm models (which are frequently updated) into product platforms that are implemented using various software languages.

It would be desirable to take a balanced approach toward improving results associated with a unit's performance and user interest in an accurate and efficient way.

SUMMARY OF THE INVENTION

According to some embodiments, systems, methods, apparatus, computer program code and means are provided to accurately and/or automatically take a balanced approach toward improving results associated with a unit's performance and user interest (and that allows for flexibility and effectiveness when implementing those results).

Some embodiments are directed to unit recommendations for an online establishment backend service. A reinforcement learning apparatus integrates a reinforcement learning algorithm model into the online establishment backend service and plugs streaming data representing user behavior and unit performance into the model. The reinforcement learning algorithm model is used to generate unit recommendations, and periodically collected relevant data is used to update the reinforcement learning algorithm model. In some embodiments, the reinforcement learning apparatus retrieves relevant unit data from a unit historical data store and user behavior data from an archive user behavior data store. The retrieved data can then be fed, during an offline training phase, into the reinforcement learning algorithm model before integrating the reinforcement learning algorithm model into the online establishment backend service (to improve performance).

Some embodiments comprise: means for integrating, by a computer processor of a reinforcement learning apparatus, a reinforcement learning algorithm model into an online establishment backend service; means for plugging streaming data of user behavior and unit performance into the reinforcement learning algorithm model; means for using the reinforcement learning algorithm model to generate unit recommendations; and means for using periodically collected relevant data to update the reinforcement learning algorithm model.

In some embodiments, a communication device associated with a back-end application computer server exchanges information with remote devices in connection with an interactive graphical user interface. The information may be exchanged, for example, via public and/or proprietary communication networks.

A technical effect of some embodiments of the invention is an improved and computerized way to accurately and/or automatically take a balanced approach toward improving results associated with a unit's performance and user interest. With these and other advantages and features that will become hereinafter apparent, a more complete understanding of the nature of the invention can be obtained by referring to the following detailed description and to the drawings appended hereto.

BRIEF DESCRIPTION OF DRAWINGS

The present disclosure is illustrated by way of example and not limitation in the following figures.

FIG. 11 illustrates a statistics collection database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
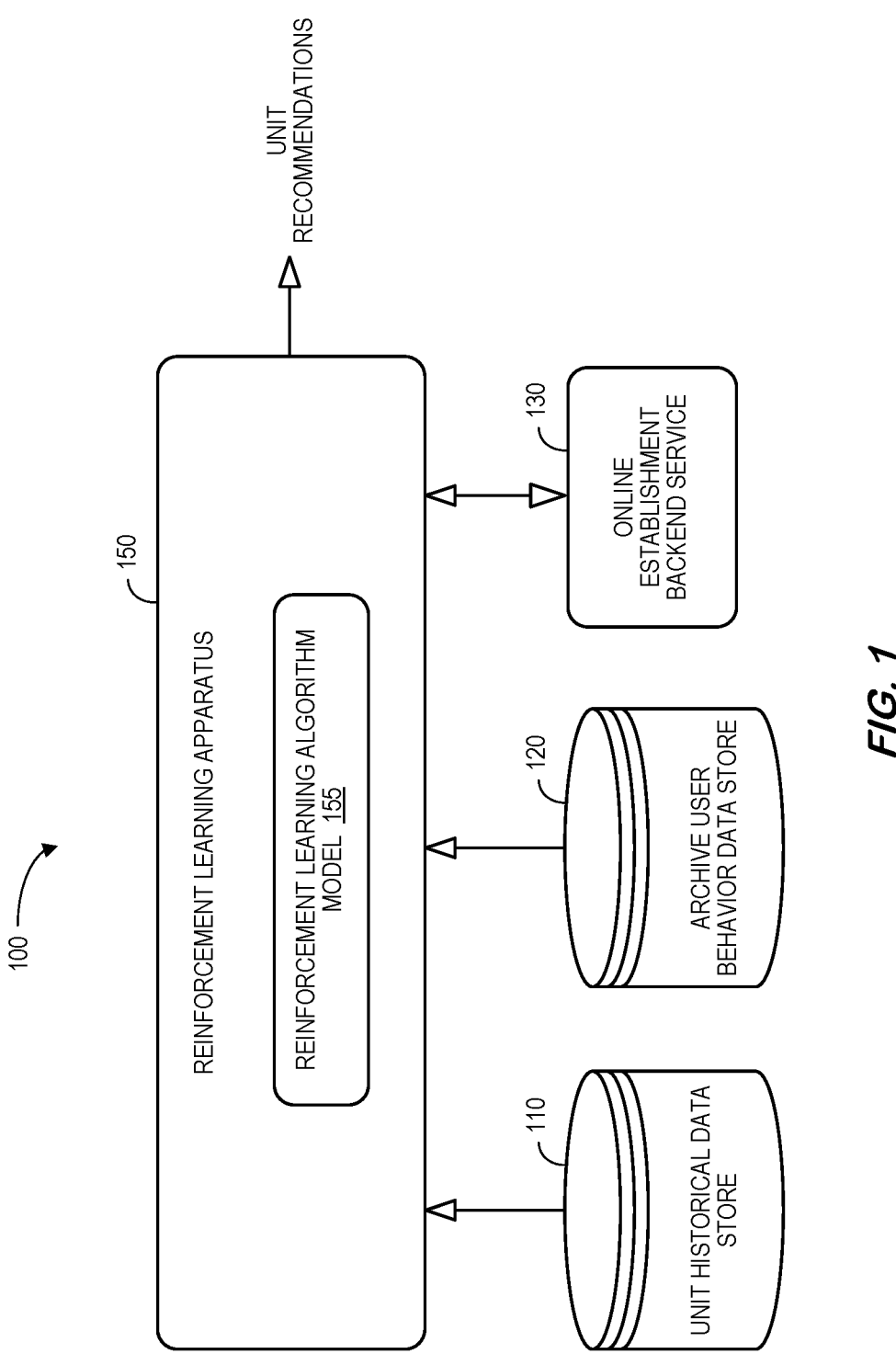
FIG. 1 is a high-level block diagram of a system in accordance with some embodiments.

An enterprise (e.g., a cloud computing service provider) may offer an online marketplace as a Software-as-a-Service ("SaaS") commerce solution that helps a direct-to-consumer brand create an integrated digital commerce experience. The solution may reach potential customers across in-store and digital channels, including mobile, social, iOS, Android application, web applications, etc. Moreover, the marketplace may use intelligent, targeted, and dynamic merchandising to create experiences that are relevant for shoppers and profitable for brands. For example, embedded Artificial Intelligence ("AI") driven recommendations suggest various product bundles that might be of interest to potential customers. SAP® Upscale Commerce is one example of such a marketplace with an AI-enabled backend system designed to understand if new features (such as new product features) will improve sales. FIG. 1 illustrates a high-level block diagram of a system 100 according to some embodiments. A unit historical data store 110, an archive user behavior data store 120, and an online establishment backend service 130 are coupled to a reinforcement learning apparatus 150. The reinforcement learning apparatus 150 may then automatically use a reinforcement learning algorithm model 155 to make unit recommendations. A used herein, the term "automatically" may refer to a device or process that can operate with little or no human interaction.

According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the unit historical data store 110), which may be locally stored or reside remote from the reinforcement learning apparatus 150. Although a single reinforcement learning apparatus 150 is shown in FIG. 1, any number of such devices may be included. Moreover, various devices described herein might be combined according to embodiments of the present invention. For example, in some embodiments, the unit historical data store 110 and reinforcement learning apparatus 150 might comprise a single apparatus. Some or all of the system 100 functions may be performed by a constellation of networked apparatuses, such as in a distributed processing or cloud-based architecture.

A cloud operator or administrator may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various reinforcement learning algorithm values) and/or receive automatically generated statistics, recommendations, results, and/or alerts from the system 100.

Figure 2:
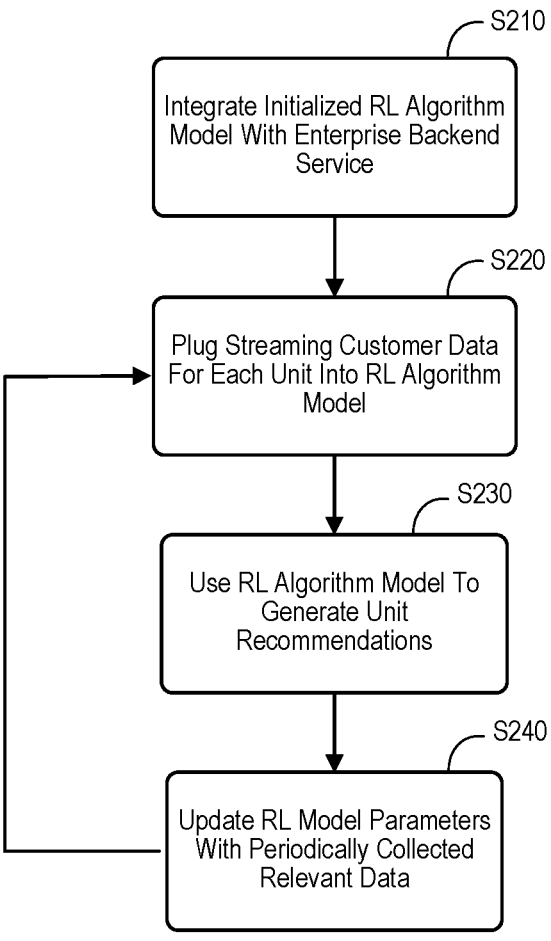
FIG. 2 illustrates a method according to some embodiments.

FIG. 2 illustrates a method according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a computer processor of a reinforcement learning apparatus may integrate a reinforcement learning algorithm model into an online establishment backend service. The model might be integrated into, for example, an online merchant. At S220, the system may plug streaming data of user behavior and unit performance into the reinforcement learning algorithm model. The user behavior data might be associated with, for example, product reviews, product searches, requests for product details, products placed into a virtual shopping cart, product purchases, review-reject statistics, etc. The unit performance data might be associated with, for example, establishment profit.

At S230, the system may use the reinforcement learning algorithm model to generate unit recommendations. For example, the system may decide to offer a product with a higher profit margin to a potential customer even though the customer may be less likely to purchase that product (as compared to a similar product with a lower profit margin). At S240, periodically collected relevant data are fed back and used to update the reinforcement learning algorithm model. The process may then iteratively continue at S220. In this way, the performance of the model may adapt and improve over time in view of changing conditions.

Thus, embodiments may successfully address the construction of product recommendations for an online merchant. In some embodiments, a powerful algorithm may be designed and implemented based on a reinforcement learning model which reaches dynamic equilibrium of profit and customer interests and supports dynamic feature introduction. The algorithm may automatically combine profit goals and other (more sophisticated) factors, such as customer interest, inventory, etc. and to achieve state-of-the-art performance. Moreover, as will be described a language-neutral algorithm framework based on GOOGLE® TensorFlow can help the algorithm model smoothly integrate with a live platform (e.g., an online merchant).

According to some embodiments, the reinforcement learning model algorithm may be associated with a Linear Function Approximation ("LFA") method for mapping Q or V values in reinforcement learning. In some embodiments, a Deep Deterministic Policy Gradient ("DDPG") may be used to learn a Q-function and a policy in deep reinforcement learning. Moreover, the algorithm model may be easily integrated in other, similar scenarios, such as searching items in inventory with considering more factors, production material preparation to find minimal cost, etc. The only effort involved may be to redesign the state, reward, action, and transition values in the Markov Decision Process ("MDP"). This can substantially reduce the development Total Cost of Ownership ("TCO") for an online merchant (tenant) and/or a cloud marketplace provider.

Figure 3:
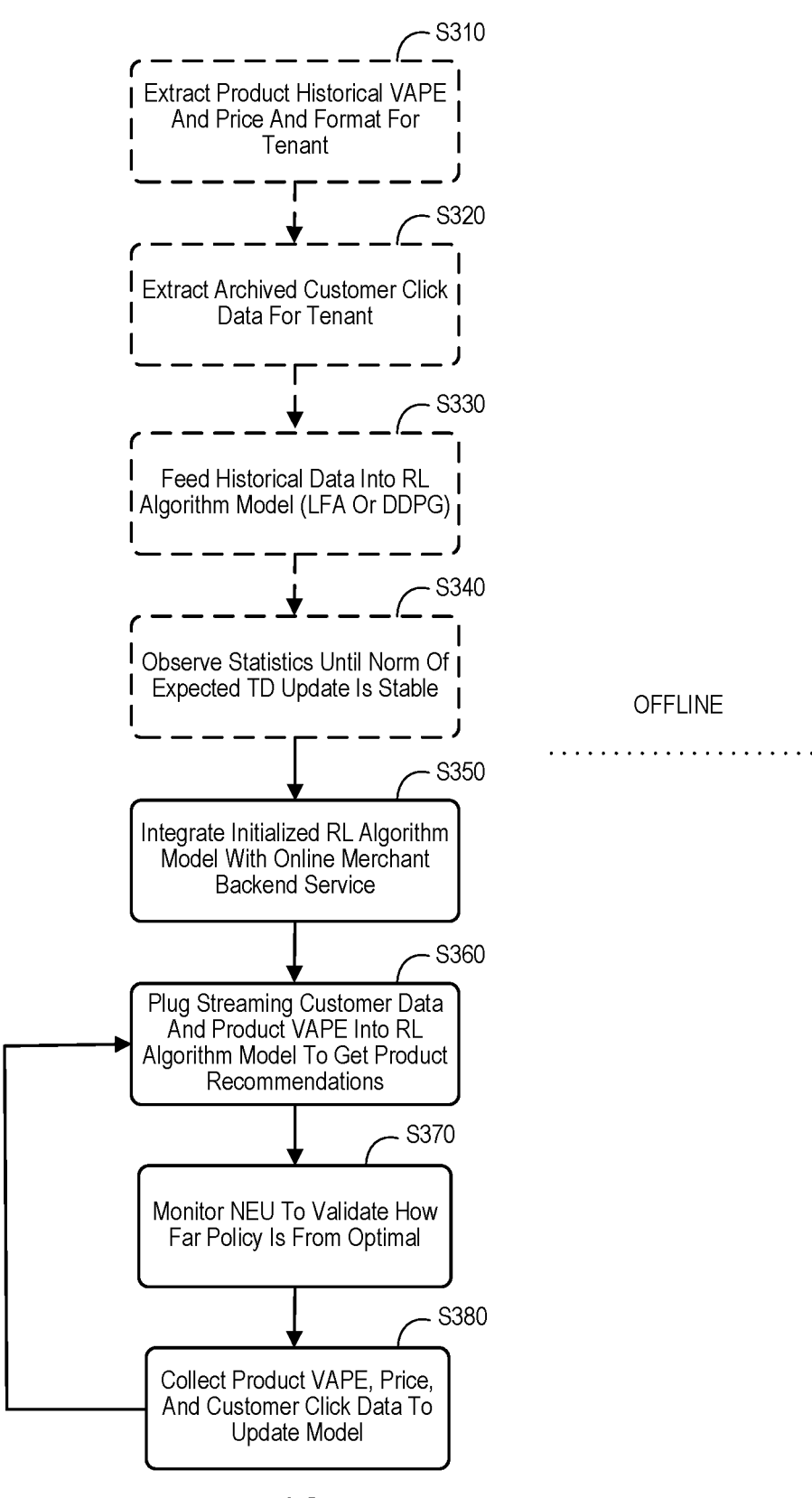
FIG. 3 is a more detailed reinforcement learning method in accordance with some embodiments.

With respect to the reinforcement learning algorithm model, some embodiments may use a product's velocity of sale ("V"), acceleration of sale ("A"), profit ("P"), and revenue ("E") with product price as a product feature. FIG. 3 is a more detailed reinforcement learning method in accordance with some embodiments. Initially, the system might prepare historical data. Note that this offline training may be optional (as illustrated by dashed lines in FIG. 3). In particular, at S310 a computer processor of a reinforcement learning apparatus may retrieve relevant unit data (product VAPE) from a unit historical data store. According to some embodiments, a "unit" is associated with a product or product bundle and a user is associated with a potential customer. That is, the system may extract the product's historical data VAPE and product price and tailor it into a target format for a target tenant. At S320, the system may retrieve, from an archive user behavior data store, user behavior data. The system may, for example, extract archived customer's click data, including customer's continual behavior on one page and product sorting in that page for the target tenant At S330, the retrieved data may then be fed (during the offline training phase) into the reinforcement learning algorithm model before integrating the reinforcement learning algorithm model into an online establishment backend service. In this way, the offline training phase may initialize the reinforcement learning algorithm model with data (for either an LFA or DDPG implementation). At S340 the system may observe statistics of the algorithm model until a Norm of the Expected Temporal Distance ("TD") Update ("NEU") value is stable. The NEY may comprise a measure that is used to appraise how close a trained policy approach is to an optimal one. In some embodiments, the NEU may be calculated as $\sqrt{E[\delta\phi]^T E[\delta\phi]}$ (so as to multiply the TD error and an action feature vector).

At S350, the system can then integrate the initialized reinforcement learning algorithm model with an online merchant backend service. Note that S310 through S340 are not mandatory. That is, the reinforcement learning algorithm might instead learn the environment gradually with data accumulation. However, with an offline pre-trained algorithm, the performance of the model can be substantially improved.

At S360, the system may plugin streaming data of customer click operations and the VAPE of each product into the algorithm model and product recommendations can be generated based on each customer's requests. At S370, the system may monitor NEU measure to validate how far a policy is from an optimal one. At S380, the system may periodically collect relevant data (as described in S310 and S320) and update reinforcement learning algorithm model parameters before continuing at S360. In this way, the results of S360 will be become more accurate.

Figure 4:
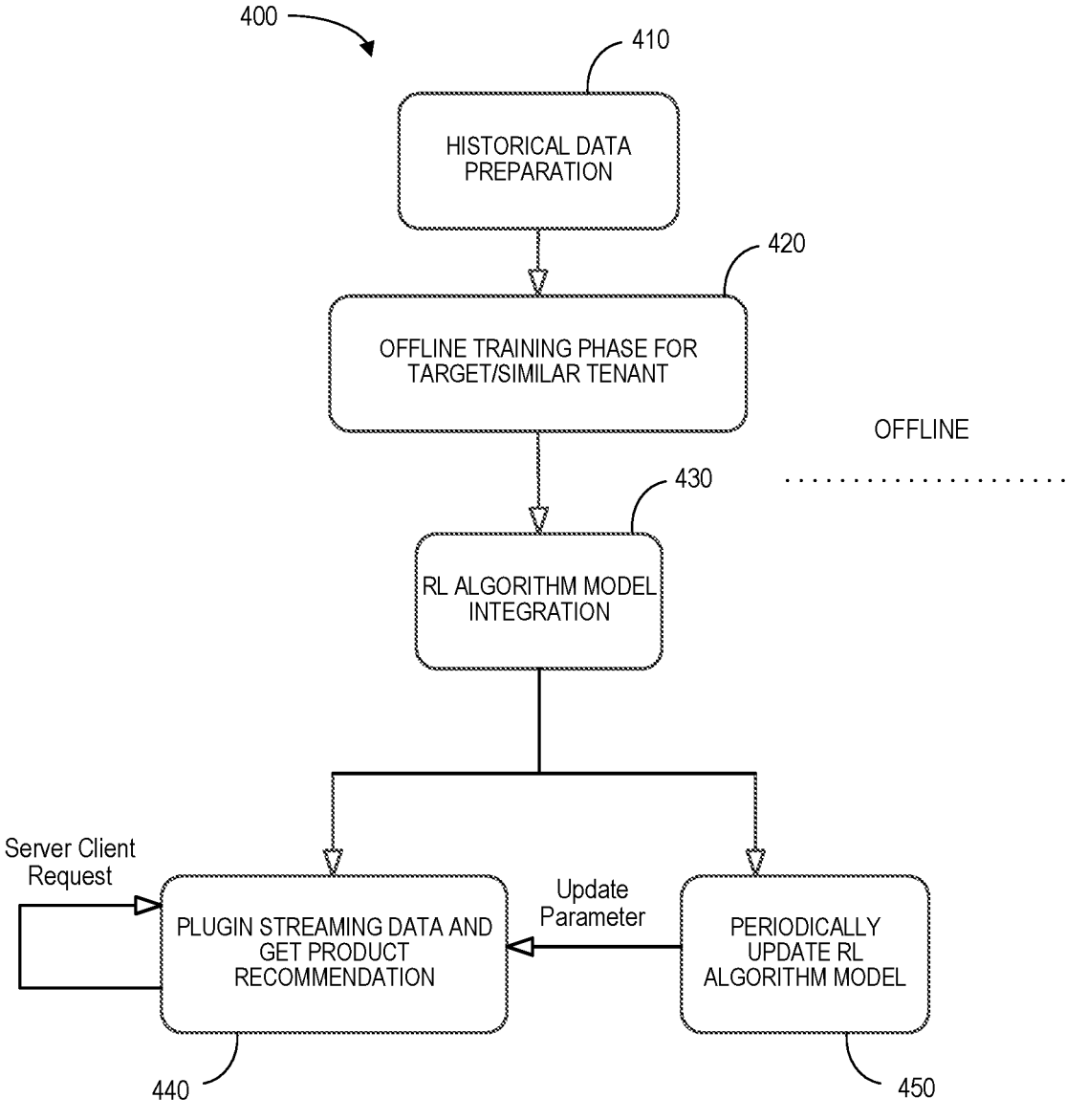
FIG. 4 is a recommendation algorithm chart according to some embodiments.

FIG. 4 is a recommendation algorithm chart 400 according to some embodiments. After historical data preparation 410, an offline training phase 420 for a target (or similar) tenant of an online merchant may be executed. After reinforcement learning algorithm integration 430, the system may plugin streaming data 440 (to get product recommendations) and periodically update the algorithm model 450 to update parameters. According to some embodiments, server client requests may be used to plugin streaming data 440. Note that elements 420, 440, and 450 may utilize a standard machine learning process.

With respect to the parameter update equation for LFA and network architect of DDPG, note that a reinforcement learning model may provide product recommendations to help an establishment reach an equilibrium with respect to gaining product revenue and satisfying customer interests.

Moreover, a <S, A, R, T> design for a Markov decision process may be associated with a loss function approximation. With respect to state definition, the system may take features of products that are searched, clicked, purchased, etc. when a page request happens. The features may include short-term features such as price, conversion rate, sales amount, etc. For example, a VAPE design uses Velocity ("V"), Acceleration ("A"), Profit ("P"), and Revenue ("E"). The features may also include long-term features, such as customer purchase power ("power"), preference for product ("item"), and preference for category ("category"). Mathematically, $S = <V_1, A_1, P_1, E_1, \ldots, V_n, A_n, P_n, E_n, \text{power}, \text{item}, \text{category}>$, where n is an index of products that are chosen by customers.

With respect to Action definition, consider, for example, "returned product sorting" as an Action. Mathematically, $\mu = <\mu_1, \mu_2, \ldots, \mu_m>$ where m is a maximum amount of product for a next query. The sorting order of product is determined by $\langle \overrightarrow{P_{feature}}, \mu \rangle$, where $\overrightarrow{P_{feature}}$ is a product feature score. To support each action, sorting weights may be provided with m(m≥0) dimension. For any status s∈ S, the output of Action is:

$$\mu_\theta(s) = (\mu_\theta^1(s), \mu_\theta^2(s), \ldots, \mu_\theta^m(s))$$

where:

$$\theta = (\theta_1, \theta_2, \ldots, \theta_m)$$

is a parameter vector of actor and for any i(1≥i≥m) and $$\mu_\theta^1(s)$$

is the sorting weight for the ith dimension having:

$$\mu_\theta^1(s) = \frac{C_i e^{\theta_i^T \phi(s)}}{\sum_{j=1}^m e^{\phi_j^T}}$$

Here, $\phi(s)$ is a feature vector of state s, $\theta_1, \theta_2, \ldots, \theta_m$ has the same dimension length as $\phi(s)$, and $C_i$ is constant for sorting weight of ith dimension (which controls dimension magnitude).

With respect to a policy gradient, a reinforcement learning objective may be to learn a $\theta^*$ that maximizes the objective gradient:

$$J(\mu_\theta) = \int_S \int_S \sum_{t=1}^\infty \gamma^{t-1} p_0(s') T(s', \mu_\theta(s'), s) R(s, \mu_\theta(s)) ds' ds =$$

$$\int_S \rho^\mu(s) R(s, \mu_\theta) ds = \mathbb{E}_{s \sim \rho_\mu}[R(s, \mu_\theta(s))]$$

where:

$$\rho^\mu(s) = \int_S \sum_{T=1}^\infty \gamma^{t-1} p_0(s') T(s', \mu_\theta(s'), s) ds'$$

where $\rho_0$ is a state initial distribution, T is a state transition junction and $J(\mu_\theta)$ is accumulative rewards under deterministic strategy $\mu_\theta$.

To maximize $J(\mu_\theta)$, the gradient of $J(\mu_\theta)$ may be calculated about parameter $\theta$. According to Policy gradient theorem:

$$\nabla_\theta J(\mu_\theta) = \int_S \rho^\mu \nabla_\theta \mu_\theta(s) \nabla_a Q^\mu(s, a \mid a = \mu_\theta(s)) ds =$$

$$\mathbb{E}_{s \sim \rho^\mu}[\nabla_\theta \mu_\theta(s) \nabla_a Q^\mu(s, a \mid a = \mu_\theta(s))]$$

where $Q^\mu(s, a)$ is a state-action pair, and the equation of $\theta$ can be updated and written as:

$$\theta_{t+1} \leftarrow \theta_t + \alpha_\theta \nabla_\theta \mu_\theta(s) \nabla_a Q^\mu(s, a \mid a = \mu_\theta(s))$$

where $\alpha_\theta$ is a learning rate, $\nabla_\theta \mu_\theta(s)$ is a Jacobian Matrix, but $Q^\mu(s, a)$ and gradient $\nabla_a Q^\mu(s, a \mid a = \mu_\theta(s))$ may be substantially difficult.

With respect to a linear function approximation, using parameter $\omega$ for Q function having:

$$Q^\mu(s,a) \approx Q^\omega(s,a) = \phi(s,a)^T \omega$$

Let $\phi(s, a) = a^T \nabla_\theta \mu_\theta(s)$ and therefore:

$$\nabla_a Q^\mu(s,a) \approx \nabla_a Q^\omega(s,a) = \nabla_a (a^T \nabla_\theta \mu_\theta(s))^T \omega = \nabla_\theta \mu_\theta(s)^T \omega$$

More importantly, $\theta$ update of policy strategy $\mu_\theta$ can be written as:

$$\theta_{t+1} \leftarrow \theta_t + \alpha_\theta \nabla_\theta \mu_\theta(s) (\nabla_\theta \mu_\theta(s))^T \omega$$

Moreover, $\omega$ update of $Q^\omega$ can also be done via Q-Learning, for sample $(s_t, a_t, r_t, s_{t+1})$, having:

$$\delta_{t+1} =$$

$$r_t + \gamma Q^\omega(s_{t+1}, \mu_\theta(s_{t+1})) - Q^\omega(s_t, a_t) = r_t + \omega_t'(\gamma \phi(s_{t+1}, \mu_\theta(s_{t+1})) - \phi(s_t, a_t))$$

$$\omega_{t+1} = \omega_t + \alpha_\omega \delta_{t+1} \phi(s_t, a_t) = \omega_t + \alpha_\omega \delta_{t+1} (a_t^T \nabla_\theta \mu_\theta(s_t))$$

With respect to an advantage function, note that Q-learning doesn't guarantee convergence. However, an advantage function may use $V(s)$ with $A(s, a)$ to estimate from state globally and the advantage given a is under state s. With a function A, the updated equations will now be provided. In particular, the Q value is as follows (with s being the state):

$$Q(s,a) = A^\omega(s,a) + V^v(s) = (a - \mu_\theta(s))^T \nabla_\theta \mu \nabla_\theta(s)^T \omega + \phi(s)v$$

Moreover, $\delta_{t+1}$ may be represented as:

$$\delta_{t+1} = r_t + \gamma Q(s_{t+1}, \mu_\theta(s_{t+1})) - Q(s_t, a_t) =$$

$$r_t + \gamma \phi(s_{t+1})^T v_t - ((a_t - \mu_\theta(s_t))^T \nabla_\theta \mu_\theta(s)^T w_t + \phi(s_t)^T v_t)$$

And the formula for $\theta_{t+1}$ is:

$$\theta_{t+1} = \theta_t + \alpha_\theta \nabla_\theta(s_t)(\nabla_\theta \mu_\theta(s_t)^T \omega_t)$$

In addition, $\omega_{t+1}$ is:

$$\omega_{t+1} = \omega_t + \alpha_\omega \delta_{t+1} \phi(s_t, a_t) = \omega_t + \alpha_\omega \delta_{t+1} (a_t^T \nabla_\theta \mu_\theta(s_t))$$

Finally, $v_{t+1}$ is as follows:

$$v_{t+1} = v_t + a_v \delta_{t+1} \phi(s_t)$$

In a training phase, embodiments may just need to update the above five parameters, which can be done by any modern deep learning framework (e.g., TensorFlow or PyTorch).

With respect to reward shaping, the definition of $\phi(s)$ is as follows:

$$\phi(s) = \sum_{i=1}^K \text{ML}(i \mid \mu_\theta(s))$$

When taking clicks and final purchases into consideration, the reward may be reshaped. In particular, $\phi_{clk}$ reward shaping may comprise:

$$\phi_{clk} = \sum_{i=1}^K y_i^c x_i^T \mu_\theta(s) - \ln\left(1 + e^{x_i^T \mu_\theta(s)}\right)$$

where $y_i \varepsilon 0$, 1 represents whether product i is clicked. Similarly, the $\phi_{pay}(s)$ reward shaping may comprise:

$$\phi_{pay}(s) = \sum_{i=1}^K y_i^c x_i^T \mu_\theta(s) - \ln\left(1 + e^{x_i^T \mu_\theta(s)}\right) + \ln \text{Price}_i$$

As can be seen, the rewards consider both the clicks and the payment/conversion information for products.

Consider now Deep Deterministic Policy Gradient ("DDPG"), which includes actor network $\mu(s|\theta^\mu)$ and critic network $Q(s, a|\theta^Q)$. As compared to the LFA previously described, DDPG networks (either actor or critic) can be modeled relatively easily with a deep neural network. As a result, development and deployment may be substantially improved. Moreover, an information loss layer may measure cross entropy loss between $X = [x_1, x_2, \ldots, x_n]$ product feature and $Y = [y_1, y_2, \ldots, y_n]$ click or buy label under customer action a. Specifically, $L(a, X, Y)$ can be calculated as:

$$L(a, X, Y) = \frac{1}{n} \sum_i^n y_i \log(\delta(a^T x_i)) + (1 - y_i) \log(1 - \delta(a^T x_i))$$

where:

$$\delta(a^T x_i) = \frac{1}{1 + e^{-a^T x_i}}$$

Finally, the gradient of actor network may comprise:

$$\nabla_{\theta^\mu} J = -\frac{1}{n} \sum_i^n \nabla_a Q(s, a \mid \theta^Q \mid s = s_i, a = \mu(s_i)) \nabla_{\theta^\mu} \mu(s \mid \theta^\mu \mid s_i) +$$

$$\lambda \nabla_a L(a, X, Y \mid a = \mu(s_i)) \nabla_{\theta^\mu} \mu(s \mid \theta^\mu \mid s_i)$$

Note that the DDPG approach may leverage the common concept actor and critic for a policy gradient algorithm.

Figure 5:
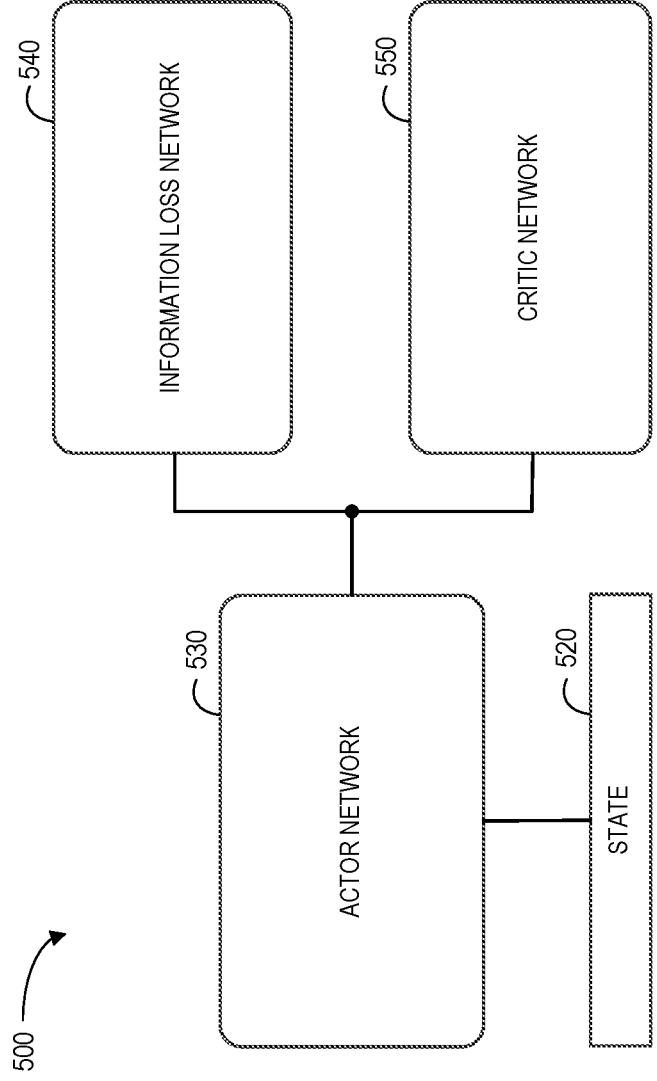
FIG. 5 is a high-level deep deterministic policy gradient system in accordance with some embodiments.

Some embodiments may be associated with a language neutral algorithm framework. FIG. 5 is a high-level deep deterministic policy gradient system 500 in accordance with some embodiments. The system 500 includes a state 520, an actor network 530, an information loss network 540, and a critic network 550. A value-based reinforcement learning method tries to find (or approximate) an optimal value function (a mapping between an action and a value). The higher the value, the better the action. Example algorithms including Q-learning and enhancements such as Deep Q Networks, etc. A policy-based algorithm (e.g., policy gradients) tries to find the optimal policy directly without the Q-value as a middleman. Actor-Critic approaches take advantage of the benefits from both value-based and policy-based approaches The model is split in two: one for computing an action based on a state and another one to produce the Q-values of the action. The actor network 530 takes as input the state 520 and outputs the best action. It controls how the agent behaves by learning the optimal policy (policy-based). The critic network 550, on the other hand, evaluates the action by computing the value function (value based). Those two models participate get better in their own role as time passes. The result is that the overall system 500 architecture will perform more efficiently as compared to the two methods separately.

Figure 6:
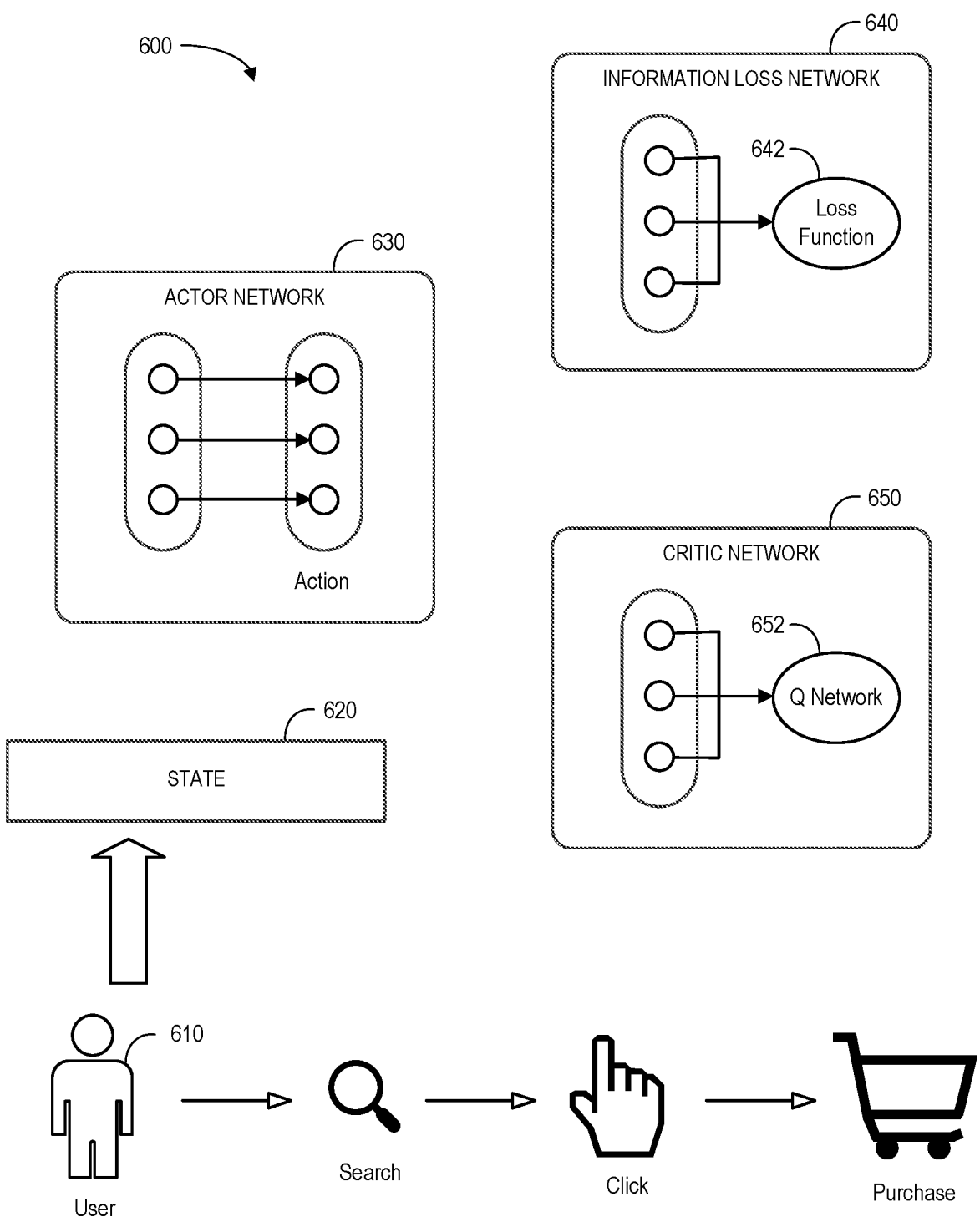
FIG. 6 is a more detailed deep deterministic policy gradient system in accordance with some embodiments.

FIG. 6 is a more detailed deep deterministic policy gradient system 600 in accordance with some embodiments. As before, the system 600 includes a state 620, an actor network 630, an information loss network 640, and a critic network 650. In this case, the state 620 may contain information about a user 610 (e.g., a potential customer) such as a user search, click, purchase, etc.

The actor network 630 can be a function approximator like a neural network and its task is to produce the best action for a given state 620. It might be a fully connected neural network, a convolutional, etc. The critic network 650 is another function approximator, which receives as input the environment and the action by the actor network 630, concatenates them and output the action value (Q network 652 value) for the given pair. The information loss network 640 contains an appropriate loss function 642. The training of the two networks 630, 650 is performed separately and may use a gradient ascent (to find the global maximum and not the minimum) to update both weights. As time passes, the actor network 630 learn how to produce better actions (starting to learn the policy) and the critic network 650 gets better at evaluating those actions. Note that the update of the weights may happen at each step (TD learning).

Figure 7:
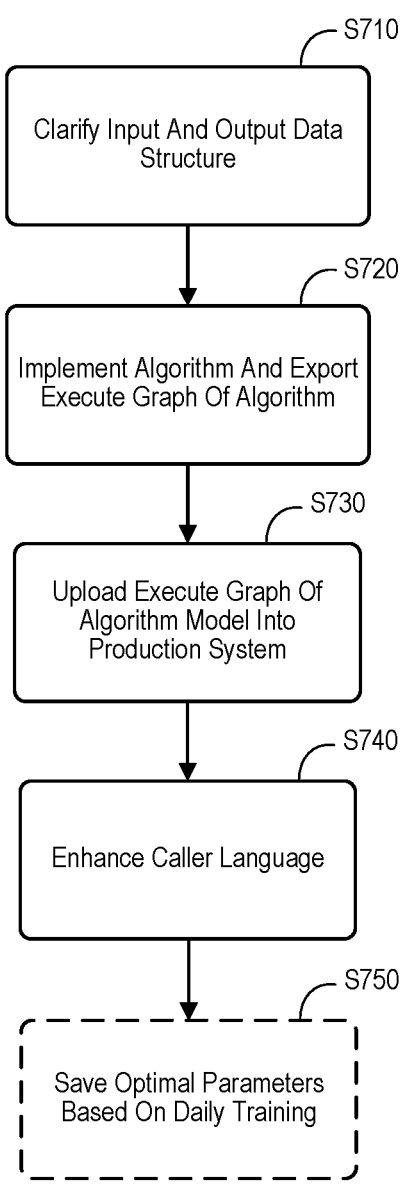
FIG. 7 is a language-neutral algorithm framework method according to some embodiments.

Some embodiments are associated with a language-neutral algorithm framework. For example, a product's velocity of sale ("V"), acceleration of sale "A"), profit ("P"), revenue ("E"), and product price as product feature. FIG. 7 is a language-neutral algorithm framework method according to some embodiments. At S710, the system may clarify an input and output data structure. At S720, the system may implement algorithm model in TensorFlow or python and export an execute graph of algorithm in a binary/XL format.

At S730, the system may upload the execute graph of the algorithm model into a production system. At S740, a caller language may be enhanced to support required functionality in a product system. This might be done, according to some embodiments, in a common library by cross-platform formats. For example, these might include Windows x86/x64, macOS, Linux and all required binary TensorFlow (library and wrapper may be associated with C++ interface into a target client programming language). At S750, the system might save its optimal parameters (as illustrated by a dashed line in FIG. 7) based on daily training. In this way, the better model can be re-loaded if an exception occurs.

Figure 8:
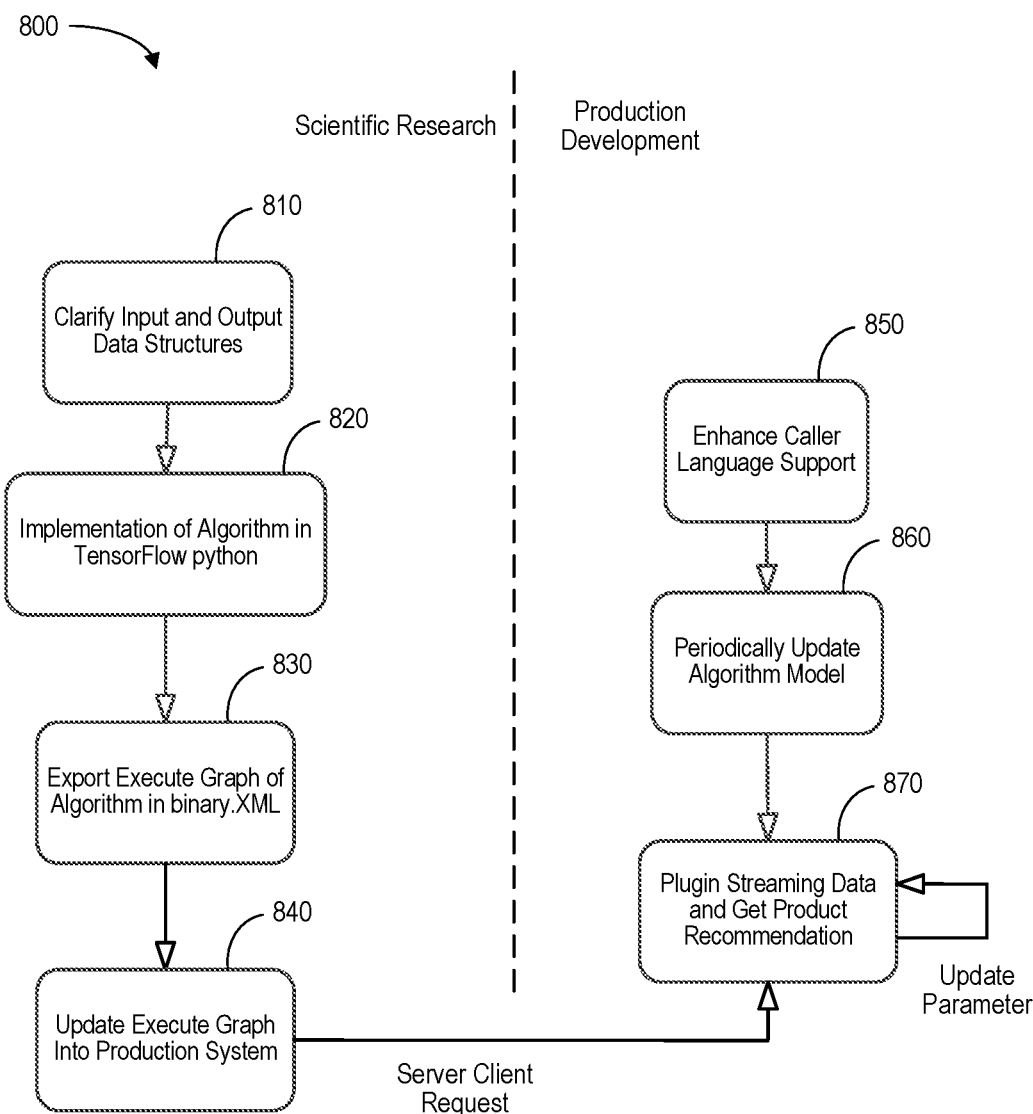
FIG. 8 is a language-neutral algorithm framework information flow diagram in accordance with some embodiments.

FIG. 8 is a language-neutral algorithm framework 800 information flow diagram in accordance with some embodiments. In a scientific research portion, the framework 800 includes clarifying input and output data structures 810 and implementing the algorithm model 820. The execute graph of the algorithm model is exported in binary/XML 830, and the system may update 840 the graph into a production system (e.g., via a server client request). A production development portion of the framework 800 enhances caller language support 850 and periodically updates the algorithm model 860. When a server client request is received from the scientific research portion, the production development portion may plugin streaming data and get product recommendation 870. By leveraging the language-neutral algorithm framework 800 based on Google TensorFlow, scientists can focus on algorithm design and developers can concentrate on how to prepare data in an appropriate pre-defined format without other efforts. Note that the language-neutral algorithm framework 800 might also be applied across other Lines Of Business ("LOB") without additional effort.

Figure 9:
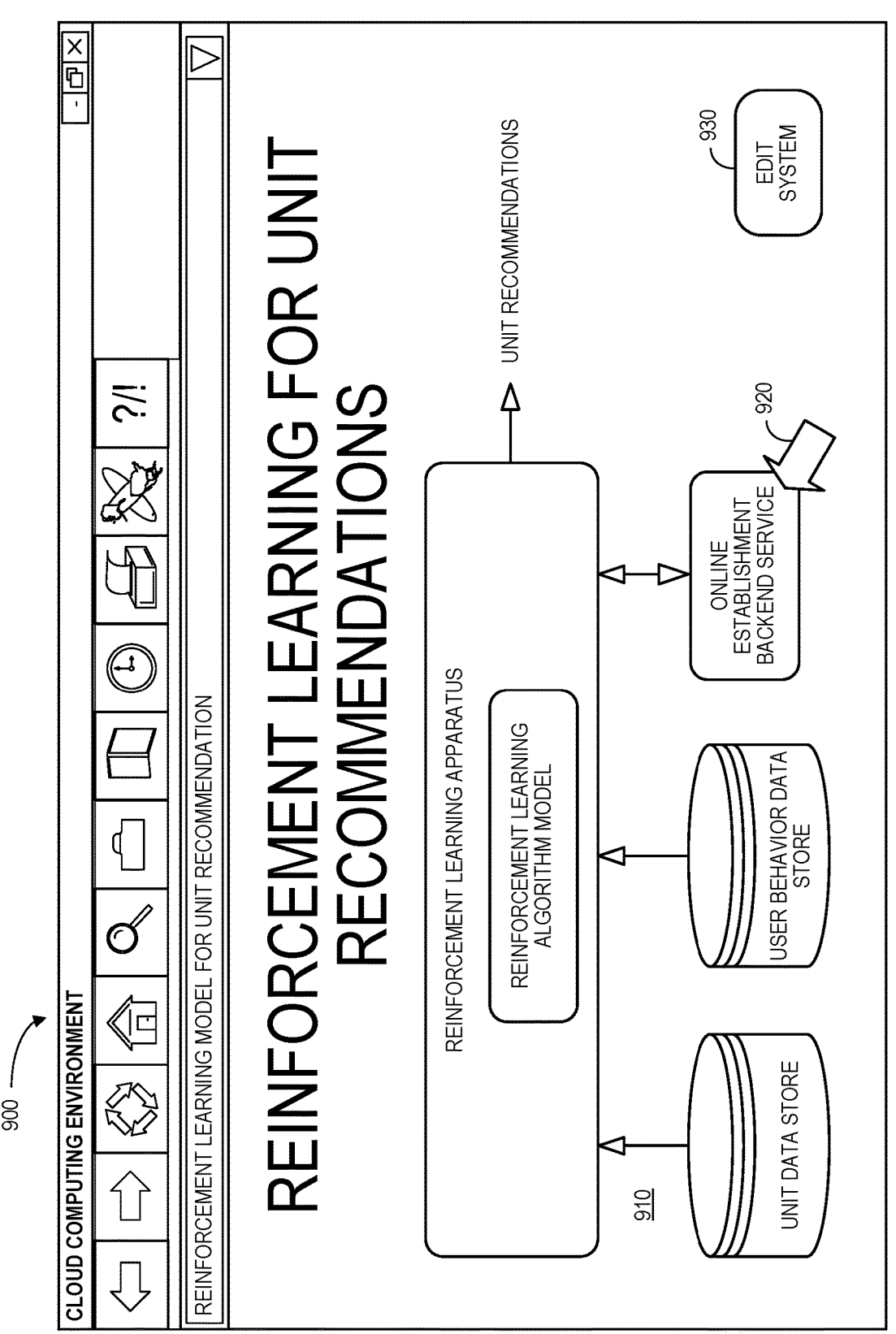
FIG. 9 is a human machine interface operator or administrator display in accordance with some embodiments.

FIG. 9 is a human machine interface operator or administrator display 900 in accordance with some embodiments. The display 900 includes a graphical representation 910 or dashboard that might be used to manage or monitor a reinforcement learning recommendation system (e.g., associated with a multi-tenant cloud provider). In particular, selection of an element (e.g., via a touchscreen or computer mouse pointer 920) might result in the display of a popup window that contains configuration data. The display 900 may also include a user selectable "Edit System" icon 930 to request system changes (e.g., to update product parameters, import tenant information, etc.).

Figure 10:
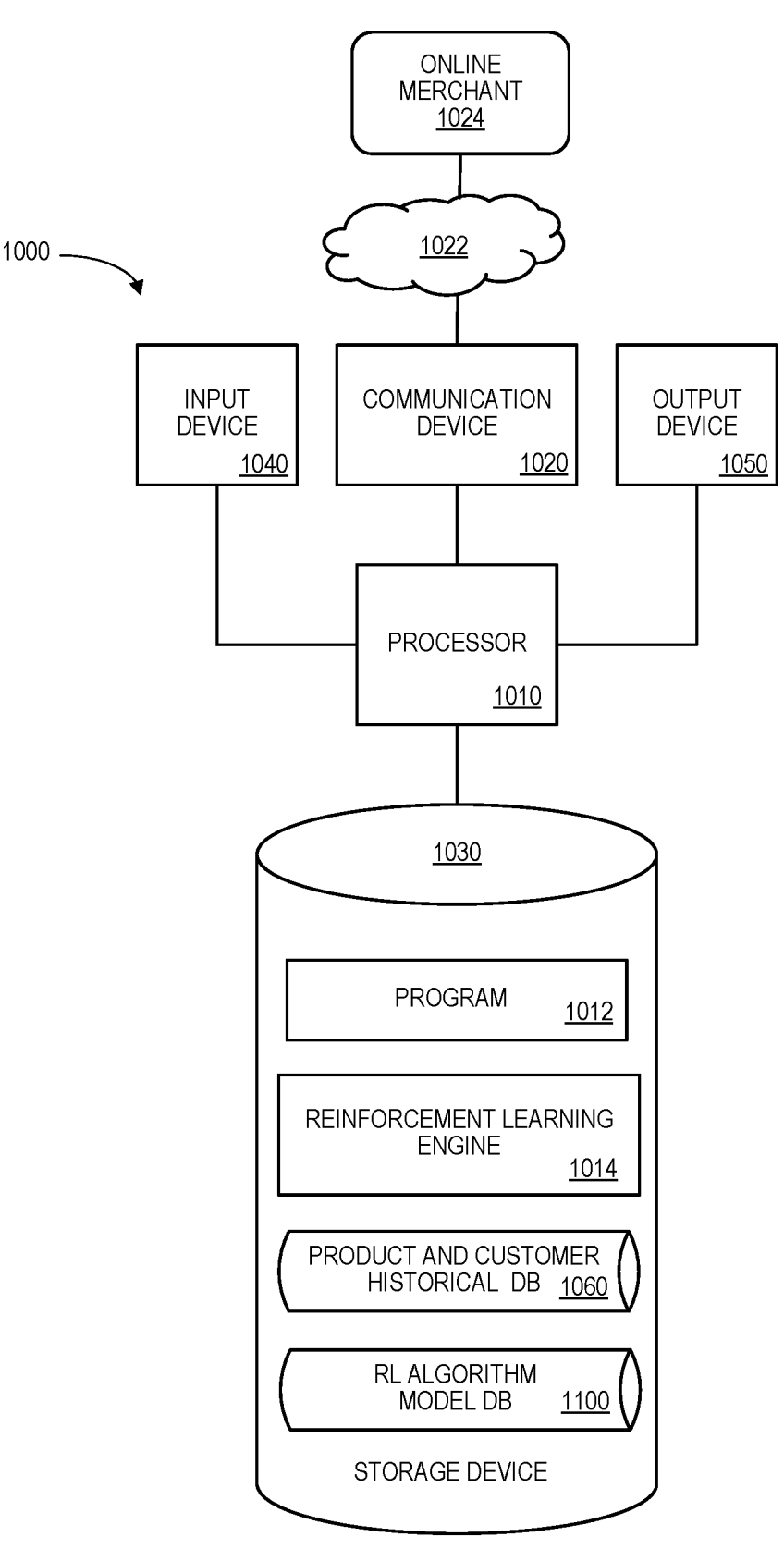
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 100 of FIG. 1 (and/or any other system described herein). The platform 1000 comprises a processor 1010, such as one or more commercially available CPUs in the form of one-chip microprocessors, coupled to a communication device 1020 configured to communicate via a communication network 1022. The communication device 1020 may be used to communicate, for example, with one or more online merchant devices 1024 (e.g., to report collected statistics, implement a new product bundle to customers, etc.) via a communication network 1022. The platform 1000 further includes an input device 1040 (e.g., a computer mouse and/or keyboard to input data about model training and/or historic user and product information) and an output device 1050 (e.g., a computer monitor to render a display, transmit recommendations or alerts, and/or create product recommendation reports and results). According to some embodiments, a mobile device and/or PC may be used to exchange data with the platform 1000.

The processor 1010 also communicates with a storage device 1030. The storage device 1030 can be implemented as a single database or the different components of the storage device 1030 can be distributed using multiple databases (that is, different deployment data storage options are possible). The storage device 1030 may comprise any appropriate data storage device, including combinations of magnetic storage devices (e.g., a hard disk drive), optical storage devices, mobile telephones, and/or semiconductor memory devices. The storage device 1030 stores a program 1012 and/or reinforcement learning engine 1014 for controlling the processor 1010. The processor 1010 performs instructions of the programs 1012, 1014, and thereby operates in accordance with any of the embodiments described herein. For example, the processor 1010 may integrate a reinforcement learning algorithm model into an online establishment backend service and plug streaming data of user behavior and unit performance into the model. The processor 1010 may then generate unit recommendations and use periodically collected relevant data to update the reinforcement learning algorithm model. In some embodiments, the processor 1010 retrieves relevant unit data from a unit historical data store and user behavior data from an archive user behavior data store. The retrieved data can then be fed, during an offline training phase, into the reinforcement learning algorithm model before integrating the reinforcement learning algorithm model into the online establishment backend service (to improve performance).

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, data may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a product and customer historical database 1060 and a reinforcement learning algorithm model database 1100. An example of a database that may be used for the platform 1000 will now be described in detail with respect to FIG. 11. Note that the database described herein is only one example, and additional and/or different data may be stored therein. Moreover, various databases might be split or combined in accordance with any of the embodiments described herein.

Referring to FIG. 11, a table is shown that represents the reinforcement learning algorithm model database 1100 that may be stored at the platform 1000 according to some embodiments. The table may include, for example, entries identifying models that have been created for various tenants associated with a cloud computing environment. The table may also define fields 1102, 1104, 1106, 1108, 1110 for each of the entries. The fields 1102, 1104, 1106, 1108, 1110 may, according to some embodiments, specify: a reinforcement learning algorithm model identifier 1102, a date and time 1104, a tenant identifier 1106, an online establishment identifier 1108, and unit recommendations 1110. The reinforcement learning algorithm model database 1100 may be created and updated, for example, when a new tenant is added to a system, when a product is added to an online marketplace, etc.

The reinforcement learning algorithm model identifier 1102 might be a unique alphanumeric label or link that is associated with a reinforcement learning algorithm model that has been created. The date and time 1104 indicate when the model was generated or updated and the tenant identifier 1106 indicates who is using the model. The online establishment identifier 1108 reflects the merchant that is recommending and selling products via the mode. The unit recommendations 1110 might indicate, for example, product bundles, search result recommendations, etc.

In this way, embodiments may take a balanced approach toward improving results associated with a unit's performance and user interest. Note that compared with previous recommendation algorithms and algorithm delivery tools/ processes, embodiments may reach balance with respect to multiple factors that are important in product recommendations. Moreover, embodiments may generate qualitive measures to evaluate how such goals have been reached in the system. The system may provide flexibility to introduce other recommendation factors (there is relatively little code adjustment if a scientist or developer wants to include more factors or adjust the priority of factors when making recommendations.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
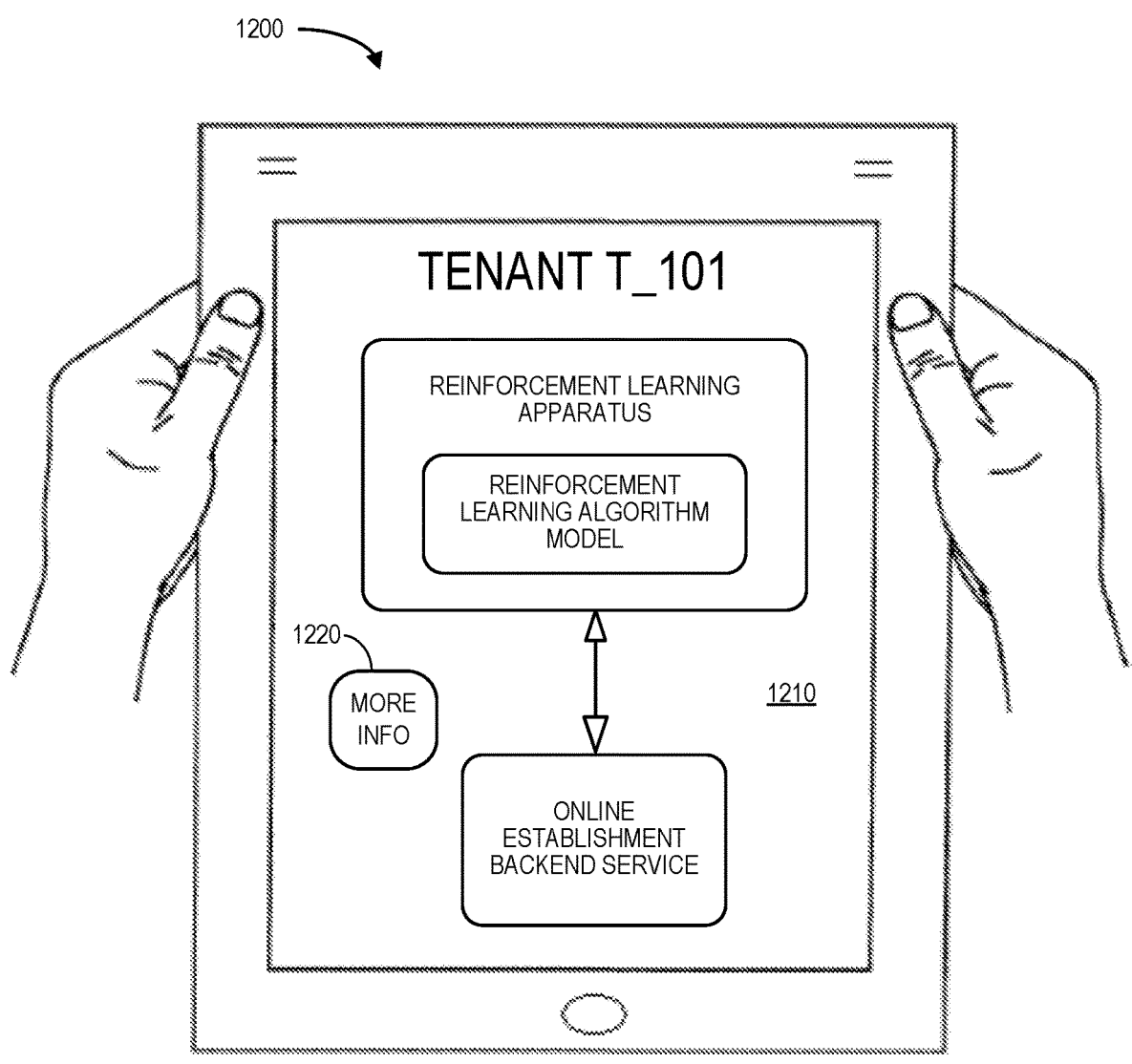
FIG. 12 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of reinforcement learning techniques, any of the embodiments described herein could be applied to other types of reinforcement learning. Moreover, the displays shown herein are provided only as examples, and any other type of user interface could be implemented. For example, FIG. 12 shows a handheld tablet computer 1200 rendering a tenant display 1210 that may be used to view or adjust existing system framework components and/or to request additional data (e.g., via a "More Info" icon 1220).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system associated with unit recommendations, comprising:

unit historical and archive user behavior data stores;

an online establishment backend service; and a reinforcement learning apparatus, coupled to the online establishment backend service, including:

a computer processor, and a computer memory coupled to the computer processor and storing instructions that, when executed by the computer processor, cause the reinforcement learning apparatus to:

retrieve relevant unit data and user behavior data, associated with a tenant of a multi-tenant cloud computing environment, from the unit historical and archive user behavior data stores, feed the retrieved data, during an offline training phase, into a tenant-specific reinforcement learning algorithm model, after the offline training phase, integrate the tenant-specific reinforcement learning algorithm model into the online establishment backend service, plug streaming data of user behavior and unit performance into the tenant-specific reinforcement learning algorithm model, use the tenant-specific reinforcement learning algorithm model to generate unit recommendations, and use periodically collected relevant data to update the tenant-specific reinforcement learning algorithm model, wherein the update to the tenant-specific reinforcement learning algorithm model using the periodically collected relevant data involves monitoring statistics of the tenant-specific reinforcement learning algorithm model to validate how far a current policy is from an optimal policy and said monitoring is based on a temporal difference error multiplied by an action feature vector.

2. The system of claim 1, wherein the relevant unit data is associated with all of: (i) unit velocity, (ii) unit acceleration, (iii) establishment profit, and (iv) establishment revenue.

3. The system of claim 2, wherein the user behavior data is associated with all of: (i) product reviews, (ii) product searches, (iii) requests for product details, (iv) products placed into a virtual shopping cart, (v) product purchases, and (vi) review-reject results.

4. The system of claim 1, wherein the tenant-specific reinforcement learning algorithm model maps a Q or V value using at least one of: (i) a Linear Function Approximation ("LFA"), and (ii) a Deep Deterministic Policy Gradient ("DDPG").

5. The system of claim 4, wherein the offline training phase includes observing statistics of the reinforcement learning algorithm model.

6. The system of claim 1, wherein a unit is associated with a product, a user is associated with a potential customer, a product price is a feature of the product, and the online establishment backend service is associated with an online merchant marketplace.

7. The system of claim 1, wherein the integration of the reinforcement learning apparatus into the online establishment backend service is performed via a language-neutral algorithm framework.

8. The system of claim 7, wherein the language-neutral algorithm framework uses a server client request to provide a reinforcement learning execute graph to a production development system.

9. A method associated with unit recommendations, comprising:

retrieving, by a computer processor of a reinforcement learning apparatus, tenant-specific relevant unit data and user behavior data from unit historical and archive user data stores;

feeding the retrieved data, during an offline training phase, into a tenant-specific reinforcement learning algorithm model;

after the offline training phase, integrating the tenant-specific reinforcement learning algorithm model into an online establishment backend service;

plugging streaming data of user behavior and unit performance into the tenant-specific reinforcement learning algorithm model;

using the tenant-specific reinforcement learning algorithm model to generate unit recommendations; and using periodically collected relevant data to update the tenant-specific reinforcement learning algorithm model, wherein the update to the tenant-specific reinforcement learning algorithm model using the periodically collected relevant data involves monitoring statistics of the tenant-specific reinforcement learning algorithm model to validate how far a current policy is from an optimal policy and said monitoring is based on a temporal difference error multiplied by an action feature vector.

10. The method of claim 9, wherein the relevant unit data is associated with all of: (i) unit velocity, (ii) unit acceleration, (iii) establishment profit, and (iv) establishment revenue.

11. The method of claim 10, wherein the user behavior data is associated with all of: (i) product reviews, (ii) product searches, (iii) requests for product details, (iv) products placed into a virtual shopping cart, (v) product purchases, and (vi) review-reject results.

12. The method of claim 9, wherein the reinforcement learning algorithm model maps a Q or V value using at least one of: (i) a Linear Function Approximation ("LFA"), and (ii) a Deep Deterministic Policy Gradient ("DDPG").

13. The method of claim 12, wherein the offline training phase includes observing statistics of the reinforcement learning algorithm model.

14. The method of claim 9, wherein a unit is associated with a product, a user is associated with a potential customer, a product price is a feature of the product, and the online establishment backend service is associated with an online merchant marketplace.

15. A non-transitory, machine-readable medium comprising instructions thereon that, when executed by a processor, cause the processor to execute operations, associated with unit recommendations, comprising:

retrieving, by a computer processor of a reinforcement learning apparatus, tenant-specific relevant unit data and user behavior data from unit historical and archive user data stores;

feeding the retrieved data, during an offline training phase, into a tenant-specific reinforcement learning algorithm model;

after the offline training phase, integrating the reinforcement learning algorithm model into an online establishment backend service;

plugging streaming data of user behavior and unit performance into the tenant-specific reinforcement learning algorithm model;

using the tenant-specific reinforcement learning algorithm model to generate unit recommendations; and using periodically collected relevant data to update the tenant-specific reinforcement learning algorithm model, wherein the update to the tenant-specific reinforcement learning algorithm model using the periodically collected relevant data involves monitoring statistics of the tenant-specific reinforcement learning algorithm model to validate how far a current policy is from an optimal policy and said monitoring is based on a temporal difference error multiplied by an action feature vector.

16. The medium of claim 15, wherein the update to the tenant-specific reinforcement learning algorithm model using the periodically collected relevant data involves monitoring statistics of the tenant-specific reinforcement learning algorithm model to validate how far a current policy is from an optimal policy.

17. The medium of claim 15, wherein the integration of the reinforcement learning apparatus into the online establishment backend service is performed via a language-neutral algorithm framework.

* * * * *